United States Patent
Snider et al.

(10) Patent No.: US 12,215,529 B2
(45) Date of Patent: Feb. 4, 2025

(54) DOOR HARDWARE COVER

(71) Applicant: Schlage Lock Company LLC, Carmel, IN (US)

(72) Inventors: Chris R. Snider, Ft. Myers, FL (US); Zachary P. Boomer, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 295 days.

(21) Appl. No.: 17/678,280

(22) Filed: Feb. 23, 2022

(65) Prior Publication Data
US 2023/0268952 A1      Aug. 24, 2023

(51) Int. Cl.
| | | |
|---|---|---|
| *E05B 9/00* | (2006.01) | |
| *E05B 1/04* | (2006.01) | |
| *E05B 15/02* | (2006.01) | |
| *E05B 17/00* | (2006.01) | |
| *H04M 1/02* | (2006.01) | |

(52) U.S. Cl.
CPC .............. *E05B 9/002* (2013.01); *E05B 1/04* (2013.01); *E05B 15/02* (2013.01); *E05B 17/002* (2013.01); *H04M 1/0247* (2013.01)

(58) Field of Classification Search
CPC . E05B 1/0084; E05B 1/04; E05B 1/06; E05B 9/00; E05B 9/002; E05B 2009/004; E05B 17/002; E05B 17/10; E05B 49/00; E05B 1/0061; E05B 1/0069; E05B 15/02; E05B 15/16; H04M 1/0247; H04M 1/0249; H04M 1/667; G06F 1/1632; H04B 1/3888
See application file for complete search history.

(56) References Cited

U.S. PATENT DOCUMENTS

| | | | | |
|---|---|---|---|---|
| 3,699,294 | A * | 10/1972 | Sudduth | H01H 1/029 264/105 |
| 6,011,961 | A * | 1/2000 | Kaschke | H04M 1/0202 455/575.1 |
| 6,116,066 | A * | 9/2000 | Gartner | E05B 47/06 70/432 |
| 8,025,537 | B2 * | 9/2011 | Craig | E05B 49/00 439/700 |
| 9,313,908 | B2 | 4/2016 | Monig et al. | |
| 9,487,971 | B2 * | 11/2016 | Quach | E05B 47/0005 |
| 9,758,991 | B2 * | 9/2017 | Lin | E05B 47/00 |
| 10,087,652 | B2 * | 10/2018 | Snider | E05B 9/00 |
| 10,236,929 | B2 | 3/2019 | Hangsleben | |
| 10,267,063 | B2 * | 4/2019 | Lin | E05B 47/06 |
| 10,273,714 | B2 | 4/2019 | Kim | |
| 10,519,694 | B2 * | 12/2019 | Lin | E05B 49/00 |
| 11,068,086 | B2 | 7/2021 | Maillard et al. | |
| 11,501,932 | B2 * | 11/2022 | Huang | E05B 49/00 |
| 2002/0056300 | A1 * | 5/2002 | Pierre | E05B 47/0688 70/303 A |

(Continued)

*Primary Examiner* — Christopher J Boswell
(74) *Attorney, Agent, or Firm* — Taft Stettinius & Hollister LLP

(57) ABSTRACT

An exemplary process generally involves forming a cover for a door hardware apparatus comprising a body. Forming the cover generally includes forming a substrate of a non-metallic material such that at least a portion of the substrate conforms to at least a portion of the body, and forming an outer layer on at least a portion of the substrate, the outer layer including a metallic material.

28 Claims, 7 Drawing Sheets

(56) References Cited

U.S. PATENT DOCUMENTS

2021/0310274 A1   10/2021  Curcio
2022/0004725 A1    1/2022  Perkins et al.
2023/0243186 A1*  8/2023  LeBlanc ............... E05B 49/006
                                                    70/278.1

* cited by examiner

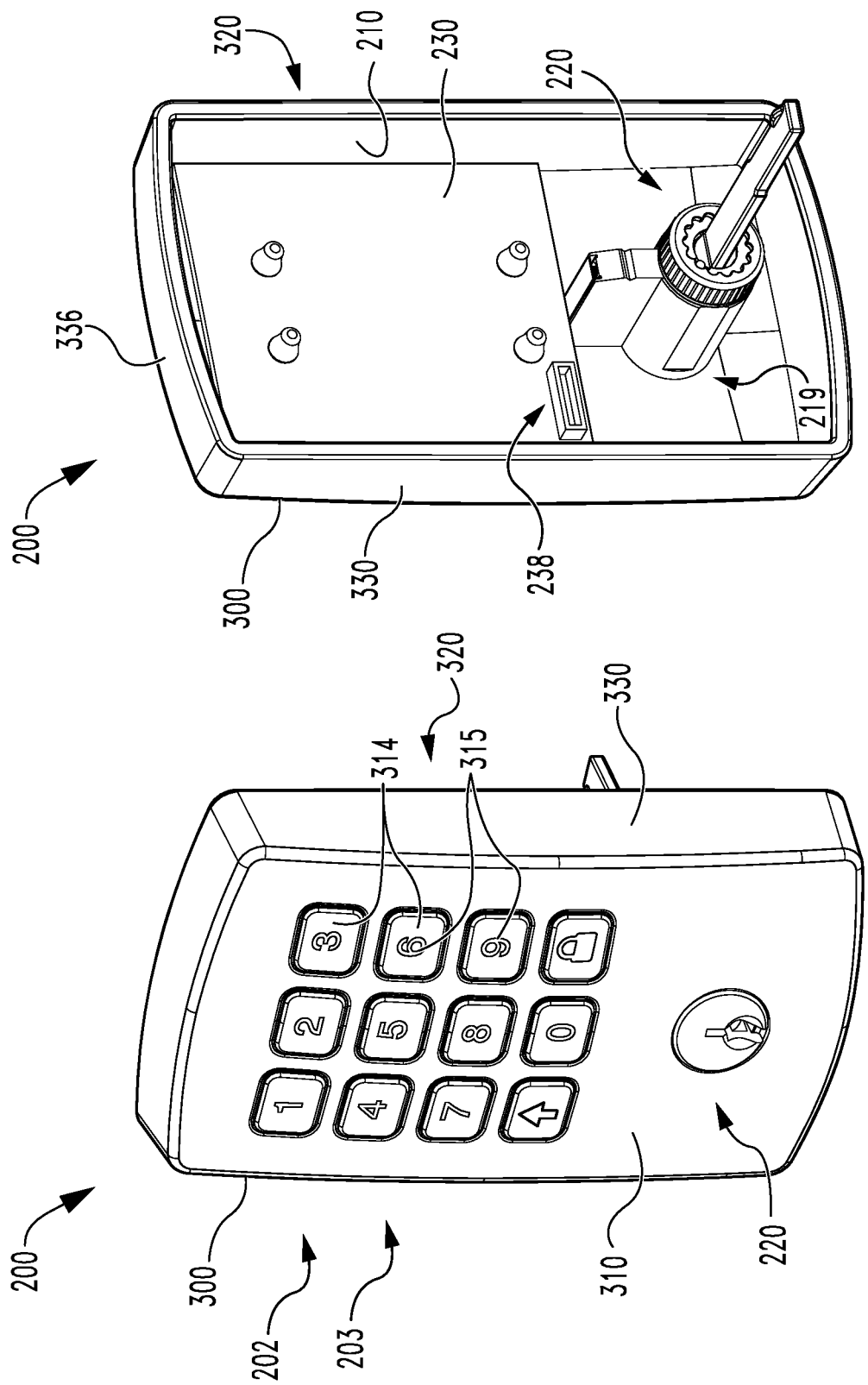

DOOR HARDWARE COVER

TECHNICAL FIELD

The present disclosure generally relates to door hardware, and more particularly but not exclusively relates to locksets.

BACKGROUND

Certain electronic locksets include a keypad by which a code can be entered to unlock the lockset. These keypads are often mounted to an escutcheon having a finished (e.g., polished or brushed) metal exterior. Due to the different manufacturing processes employed to create the keypad and the escutcheon, the finish of the keypad is typically not the same as that of the escutcheon, which may be aesthetically unpleasing to some users. For these reasons among others, there remains a need for further improvements in this technological field.

SUMMARY

An exemplary process generally involves forming a cover for a door hardware apparatus comprising a body. Forming the cover generally includes forming a substrate of a non-metallic material such that at least a portion of the substrate conforms to at least a portion of the body, and forming an outer layer on at least a portion of the substrate, the outer layer including a metallic material. Further embodiments, forms, features, and aspects of the present application shall become apparent from the description and figures provided herewith.

BRIEF DESCRIPTION OF THE FIGURES

FIG. 2 is a front perspective view of a trim according to certain embodiments.

FIG. 3 is a rear perspective view of the trim illustrated in FIG. 2.

DETAILED DESCRIPTION OF ILLUSTRATIVE EMBODIMENTS

Figure 1:
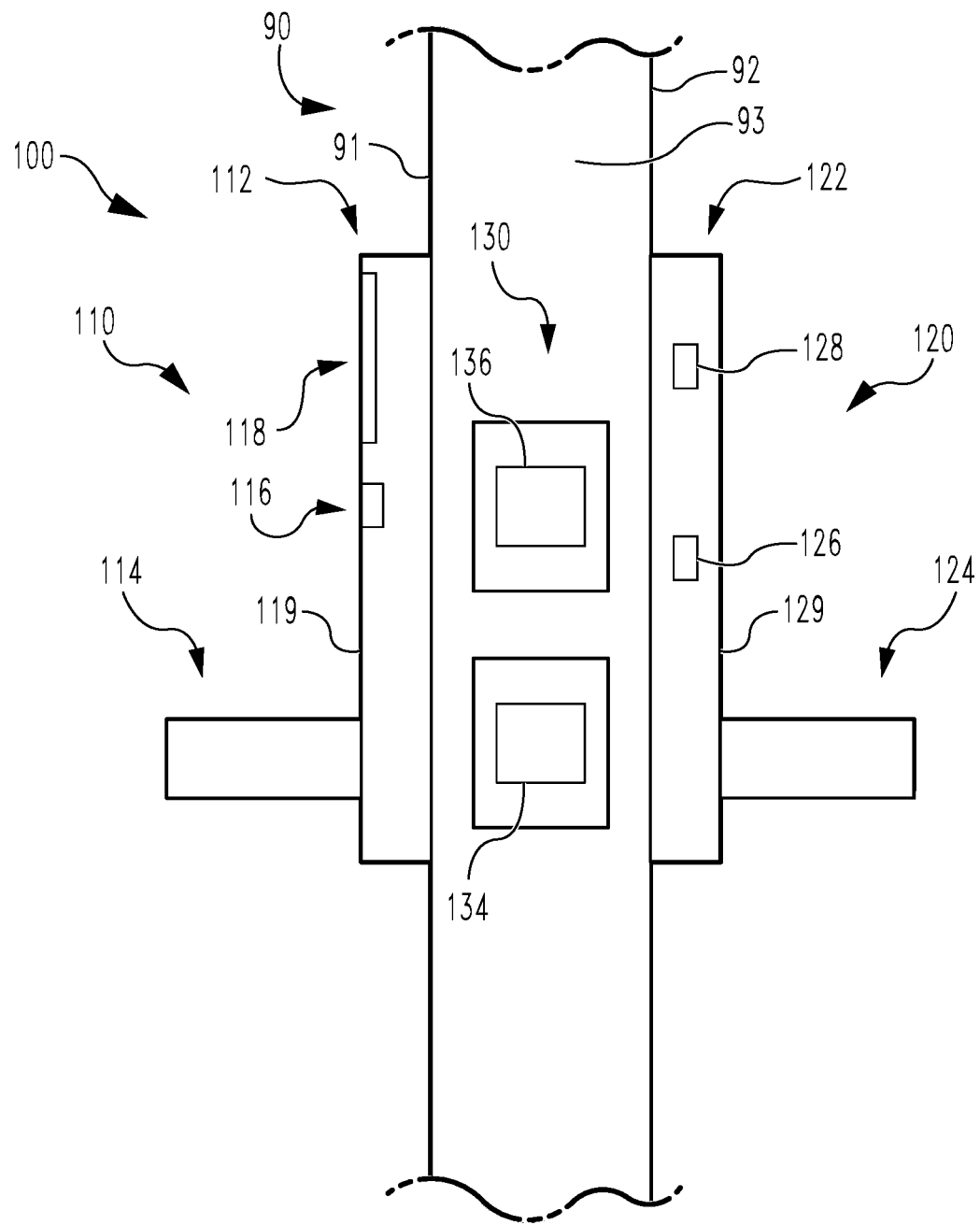
FIG. 1 is a schematic representation of a lockset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a schematic representation of a lockset 100 according to certain embodiments. The lockset 100 is mounted to a door 90, and generally includes an outside trim 110 mounted to non-egress side 91 of the door 90, an inside trim 120 mounted to an egress side 92 of the door 90, and at least one bolt 130 mounted for extension from a latch edge 93 of the door 90.

The outside trim 110 is configured for mounting to the non-egress side 91 of the door 90, and in the illustrated form includes an outside escutcheon 112, an outside handle 114 rotatably mounted to the escutcheon 112, a lock cylinder 116 mounted to the escutcheon 112, and a credential reader 118 mounted to the escutcheon 112, and may further include a cover 119 covering at least a portion of the escutcheon 112. The outside handle 114 is operably connected with a latchbolt 134 such that the handle 114 is at least selectively operable to retract the latchbolt 134. For example, the handle 114 may be operable to retract the latchbolt 134 when the lockset 100 is in an unlocked state, and inoperable to retract the latchbolt 134 when the lockset 100 is in a locked state. The lock cylinder 116 is operably connected with a deadbolt 136 such that the lock cylinder 116 is operable to extend and retract the deadbolt 136 when actuated by a proper key. The credential reader 118 is operable to receive user input comprising credential information. In various forms, the credential reader 118 may include one or more of a keypad, a biometric scanner (e.g., a fingerprint scanner, a facial scanner, an iris scanner, and/or a retinal scanner), a card reader (e.g., a smart card reader and/or a proximity card reader), a near field communication (NFC) reader, and/or another form of credential reader.

The inside trim 120 is configured for mounting to the egress side 92 of the door 90, and in the illustrated form includes an inside escutcheon 122, an inside handle 124 rotatably mounted to the escutcheon 122, a lock actuator 126 operable to alter a locked/unlocked state of the lockset 100, and a controller 128 configured to control operation of the lock actuator 126, and may further include a cover 129 covering at least a portion of the escutcheon 122. The inside handle 124 is operably connected with the latchbolt 134 such that the handle 124 is at least selectively operable to retract the latchbolt 134. In certain embodiments, the lock actuator 126 is operable to extend and/or retract the deadbolt 136 under control of the controller 128. Additionally or alternatively, the lock actuator 126 may be configured to selectively prevent the outside handle 114 from actuating the latchbolt 134. The controller 128 is in communication with the credential reader 118, and is configured to control operation of the lock actuator 126, for example based upon information received from the credential reader 118. By way of illustration, the controller 128 may transmit to the lock actuator 126 an unlock signal in response to receipt of an authorized credential via the credential reader 118, and the lock actuator 126 may unlock the lockset 100 (e.g., by retracting the deadbolt 136 and/or permitting retraction of the deadbolt 136 and/or the latchbolt 134) in response to the unlock signal.

As noted above, the lockset 100 includes at least one bolt 130, and in the illustrated form includes both a latchbolt 134 and a deadbolt 136. It is also contemplated that the lockset 100 may include only one of a latchbolt 134 or a deadbolt 136, or may include plural latchbolts 134 and/or plural deadbolts 136. In the illustrated form, the latchbolt 134 is at least selectively operable to be retracted by each of the handles 114, 124, and the deadbolt 136 is operable to be retracted by each of the lock cylinder 116 and the lock actuator 126.

In the illustrated form, at least one of the outside trim 110 or the inside trim 120 includes a corresponding and respective cover 119/129. As described herein, the cover 119/129 covers at least a portion of the corresponding escutcheon 112/122, and may further aid in providing a seal to protect internal components of the lockset 100 from the elements.

Figure 4:
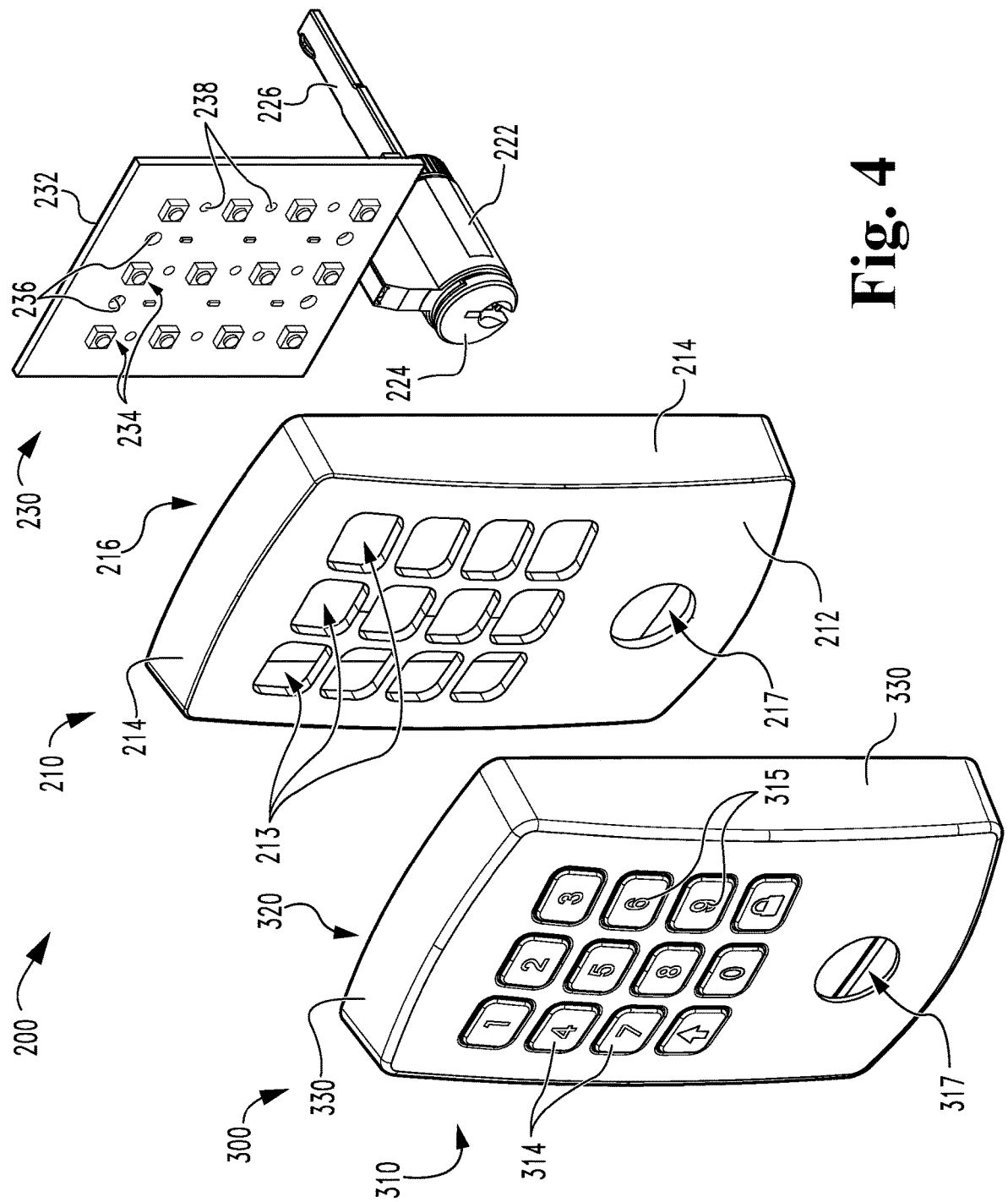
FIG. 4 is an exploded assembly view of the trim illustrated in FIG. 2.

With additional reference to FIGS. 2-4, illustrated therein is a door hardware apparatus in the form of a trim 200 according to certain embodiments. The trim 200 generally includes an escutcheon 210, a lock cylinder 220 mounted in the escutcheon 210, a printed circuit board assembly (PCBA) 230 mounted in the escutcheon 210, and a cover 300 according to certain embodiments. The trim 200 may, for example, be utilized as the outside trim of a lockset along the lines of the above-described lockset 100. While the illustrated trim 200 is provided in the form of an outside trim including a credential reader 202 in the form of a keypad assembly 203, it is also contemplated that the concepts described in association with the trim 200 may be utilized in connection with an inside trim, such as the inside trim assembly 120.

The escutcheon 210 provides structural support for the trim 200, and generally includes a front face 212 and a plurality of walls 214 that extend from the front face 212 to a rear face 216 of the escutcheon. The front face 212 includes a plurality of openings 213 sized and shaped to receive keys 314 of the cover 300. Each wall 214 terminates at a corresponding and respective rear surface 215 that partially defines the rear face 216. In the illustrated form, the rear face 216 is generally open to a chamber 218 defined by the escutcheon, and a lock cylinder mounting location 219 is formed within the chamber 218. Additionally, the front face 212 further includes an opening 217 through which the plug 224 of the lock cylinder 220 is accessible. In certain embodiments, such as those in which the cover 300 covers the entire escutcheon 210, the escutcheon 210 may be raw (i.e., unfinished).

In the illustrated form, the lock cylinder 220 is mounted to the lock cylinder mounting location 219 and is positioned at least partially in the chamber 218. As is typical of lock cylinders, the lock cylinder 220 generally includes a shell 222, a plug 224 rotatably mounted in the shell 222, a tailpiece 226 operable to be rotated by the plug 224, and a tumbler system 228 (FIG. 5) configured to selectively prevent rotation of the plug 224 relative to the shell 222. The shell 222 is rotationally coupled with the escutcheon 210, and provides support for the plug 224, which is rotatably mounted therein. The tailpiece 226 extends distally from the plug 224 and is operable to engage a lock mechanism such that rotation of the tailpiece 226 actuates the lock mechanism. In certain embodiments, the lock mechanism engaged by the tailpiece 226 may be a deadbolt that extends and retracts in response to rotation of the tailpiece 226 in opposite directions. In certain embodiments, the lock mechanism may be operable to selectively prevent rotation of a handle that is operably connected with a latchbolt.

The PCBA 230 is mounted in the chamber 218, and in the illustrated form includes a printed circuit board (PCB) 232 and a plurality of buttons 234 mounted to the PCB 232. Each of the buttons 234 is aligned with a corresponding opening 213 such that each button 234 may be actuated by depression of a corresponding key 314. In certain embodiments, the PCB 232 may include one or more apertures 236 that facilitate assembly of the trim 200 as described herein. The PCBA 230 includes or is configured for connection (e.g., via a port 238) with a controller (e.g. the controller 128) such that the controller is operable to receive credential information via the PCBA 230. As will be appreciated, the credential reader 202 of the illustrated trim 200 is provided in the form of a keypad assembly 203, the buttons 234 of which transmit signals when depressed such that the signals generated by the depression of a particular sequence of buttons 234 can be interpreted by the controller as an access code or credential information. When the credential information matches an authorized credential, the controller 128 may transmit an unlock signal that causes the lockset 100 to transition to its unlocked state (e.g., by retracting the deadbolt 136 and/or permitting retraction of the latchbolt 134 and/or the deadbolt 136).

Figure 5:
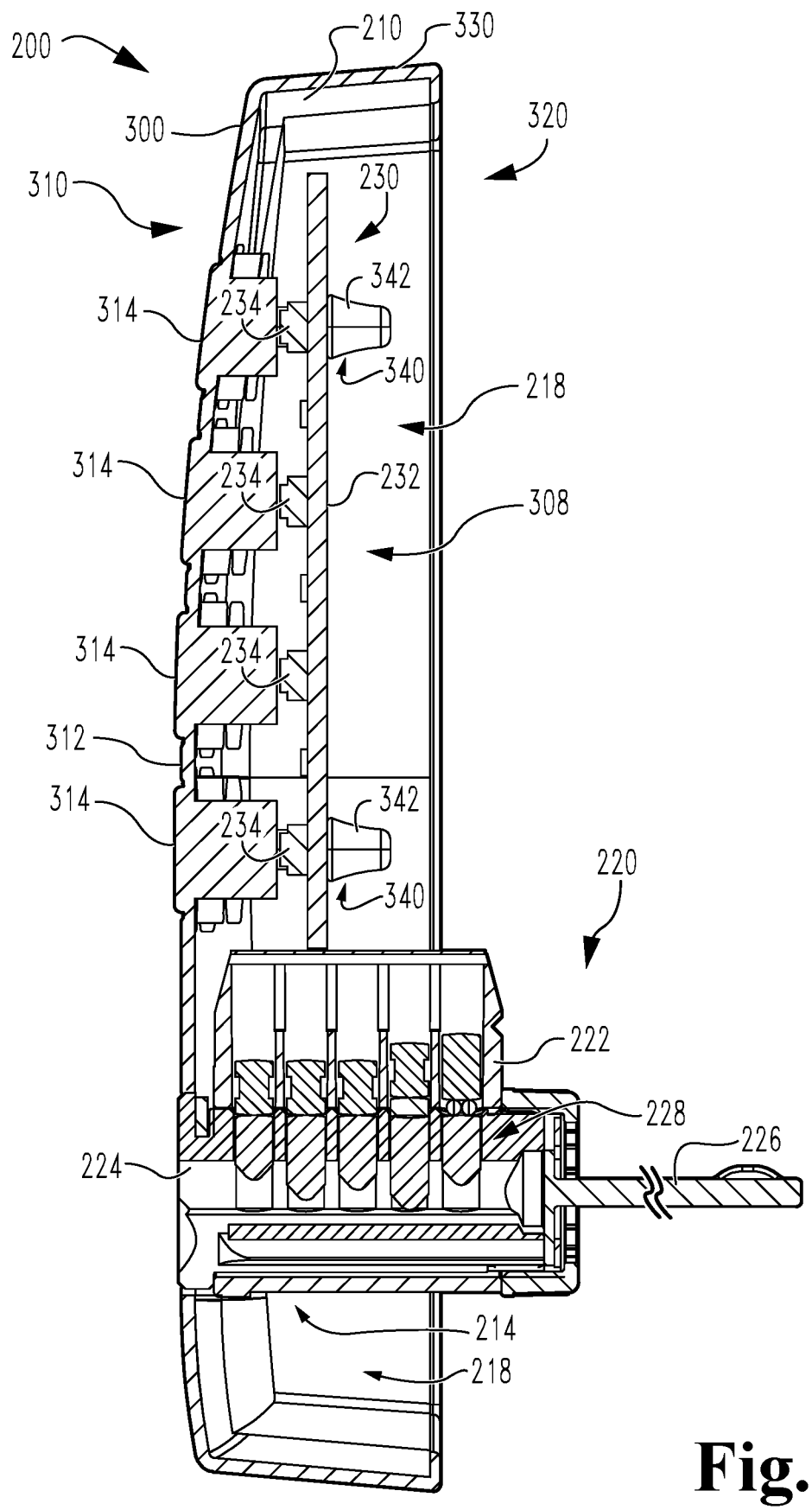
FIG. 5 is a cross-sectional view of the trim assembly illustrated in FIG. 2.
Figure 6:
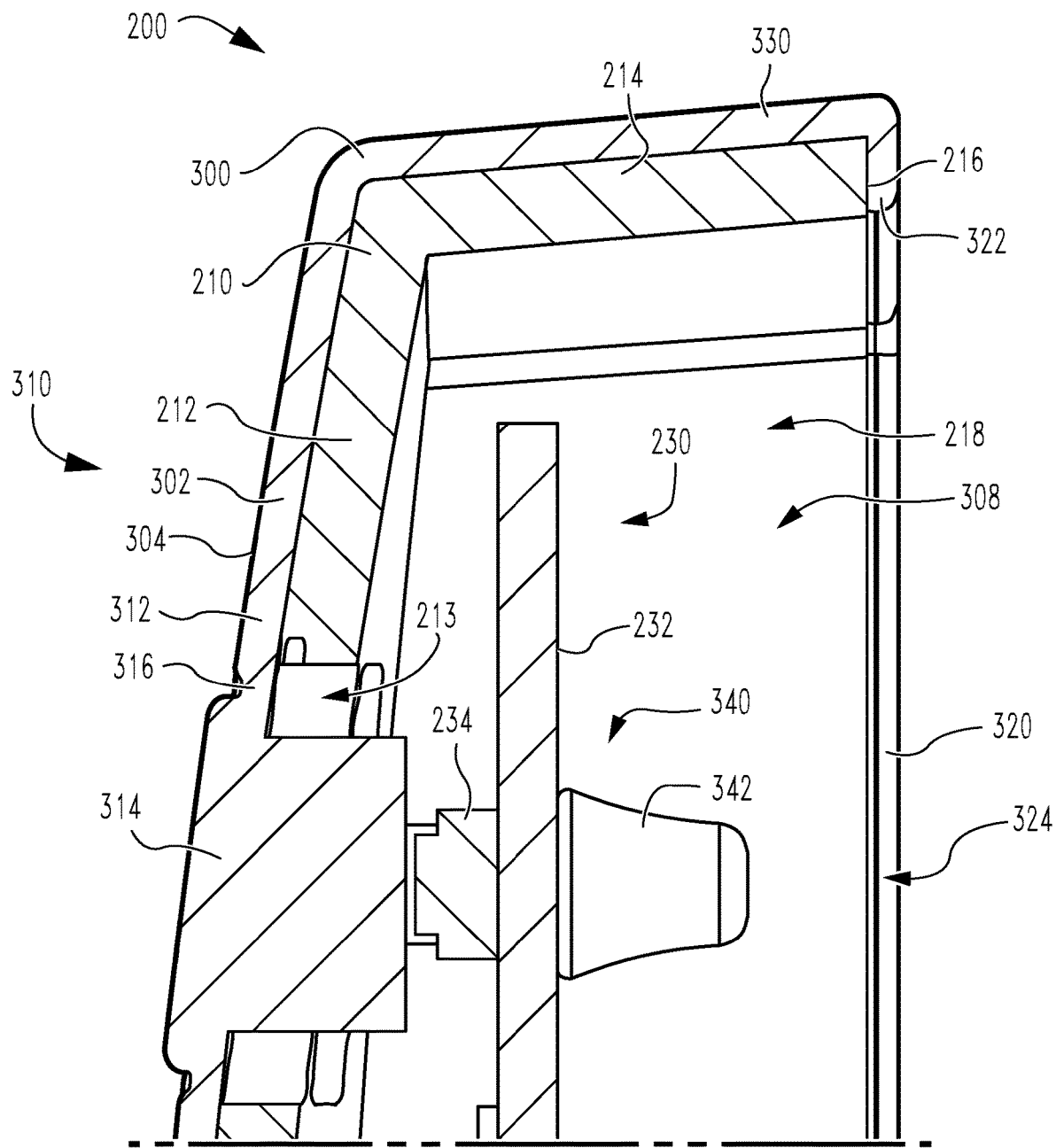
FIG. 6 is an enlarged view of a portion of the cross-section illustrated in FIG. 5.

With additional reference to FIGS. 5 and 6, the cover 300 conforms to at least a portion of the escutcheon 210, and generally includes a monolithic substrate or monolithic structure 302 that is integrally formed as a single-piece structure, and further includes an outer layer 304 that coats the monolithic structure 302. The monolithic structure 302 is formed of a non-metallic material such as a plastic material, and the outer layer 304 may be formed of a metallic material. In certain forms, the monolithic structure 302 is formed of a thermoplastic material, such as thermoplastic polyurethane. The monolithic structure 302 may, for example, be formed via a molding process, and may subsequently be coated with the metallic outer layer 304 via a suitable process (e.g., cladding). The non-metallic monolithic structure 302 provides the cover 300 with a certain amount of rigidity while remaining slightly flexible, while the metallic outer layer 304 provides the cover 300 with a metallic finish that many users are accustomed to expecting from a door hardware apparatus. As described herein, the cover 300 includes a front side 310, a rear side 320, and at least one wall 330 extending between the front side 310 and the rear side 320 such that a chamber 308 is formed within the cover 300.

The front side 310 of the cover 300 generally includes a stationary portion 312 and one or more keys 314 movably connected with the stationary portion 312 via flexible regions 316, each of which circumferentially surrounds the corresponding key 314. The stationary portion 312 remains stationary relative to the escutcheon 210, and the keys 314 extend through the openings 213 to a location adjacent a corresponding button 234 such that depression of a key 314 actuates the corresponding button 234. The flexible regions 316 may, for example, be provided with a lesser thickness than the stationary portion 312 to facilitate movement of each key 314 between a depressed position and a projected position while biasing the key 314 toward its projected position. In the illustrated form, the front side 310 further includes an opening 317 through which the plug 224 of the lock cylinder 220 is accessible.

The rear side 320 of the cover 300 generally includes a lip 322 that circumferentially surrounds an opening 324 through which the chambers 218, 308 are accessible from the rear side of the trim 200. The lip 322 projects inward from the one or more outer walls 330, and is positioned behind the rear side 216 of the escutcheon 210 such that the escutcheon 210 is closely captured between the front side 310 and the rear lip 322. Moreover, due to the somewhat flexible nature of the material forming the cover 300, the rear side 320 may be operable to form a seal with the door 90 when placed against the door 90.

The side walls 330 extend rearward from the front side 310 to the rear side 320, and generally conform to the side walls 214 of the escutcheon 210. In the illustrated form, the cover 300 has a generally rectangular cross-section, and includes four side walls 330. It is also contemplated that other geometries may be utilized, and that the cover 300 may include more or fewer sidewalls.

In certain embodiments, the cover 300 may further include one or more posts 340 that extend rearward from the front side 310 into the chamber 308. Such posts 340 may extend through the apertures 236 in the PCB 232 to prevent relative lateral shifting of the PCBA 230 and the cover 300. In the illustrated form, each post 340 includes a corresponding and respective head 342 that engages a rear side of the PCB 232 to prevent relative longitudinal shifting of the PCBA 230 and the cover 300. In certain embodiments, the head 342 may be a flexible head that flares outward once passed through the apertures 236. It is also contemplated that the head 342 may be formed by upsetting or otherwise deforming the distal end portion of the post 342 after it has passed through the aperture 236. It is also contemplated that the post 340 may be secured to the PCB 232 via one or more fasteners, such as screws.

As noted above, certain embodiments of the subject application involve a monolithic substrate 302. While other materials are contemplated, in certain embodiments, the monolithic substrate 302 is formed of thermoplastic polyurethane (TPU) or a TPU hybrid. Such materials may provide one or more advantages that may not necessarily be provided by other materials. As one example, forming the substrate 302 of a material comprising TPU may enable the substrate 302 to be non-opaque (e.g., transparent or translucent). In such forms, the outer layer 304 may be selectively deposited on the substrate 302 (or selectively removed from the substrate 302) to form indicia 315 (e.g. numbers, letters, symbols, etc.) that may be illuminated by a light source 238 (e.g., a light emitting diode) positioned within the escutcheon 210 (e.g., on the PCBA 230). In certain forms, the indicia 315 may be opaque (e.g. formed of the outer layer 304) and the surrounding area may be non-opaque. It is also contemplated that the indicia 315 may be non-opaque, and the area surrounding the indicia 315 may be opaque (e.g., formed of the outer layer 304). In either form, the outer layer 304 may be said to comprise the indicia 315.

Materials such as TPU may additionally or alternatively provide enhanced resistance to ultraviolet radiation. By contrast, may materials typically used to form flexible keys (e.g., silicone) are often susceptible to ultraviolet radiation and/or require inhibitors and/or coatings to protect the keypad material from ultraviolet radiation.

While one example of a trim 200 has been thus far described and illustrated, it should be appreciated that a trim according to other embodiments may include additional or alternative features. As one example, the trim may include a handle (e.g., lever or knob) rotatably mounted to the escutcheon 210. In these forms and others, the keypad 303 may be omitted. Moreover, while the illustrated trim 200 is an outside trim configured for mounting to the non-egress side 91 of a door 90, it is also contemplated that a cover along the lines of the cover 300 may be utilized in connection with an inside trim configured for mounting to the egress side 92 of a door 90.

Figure 7:
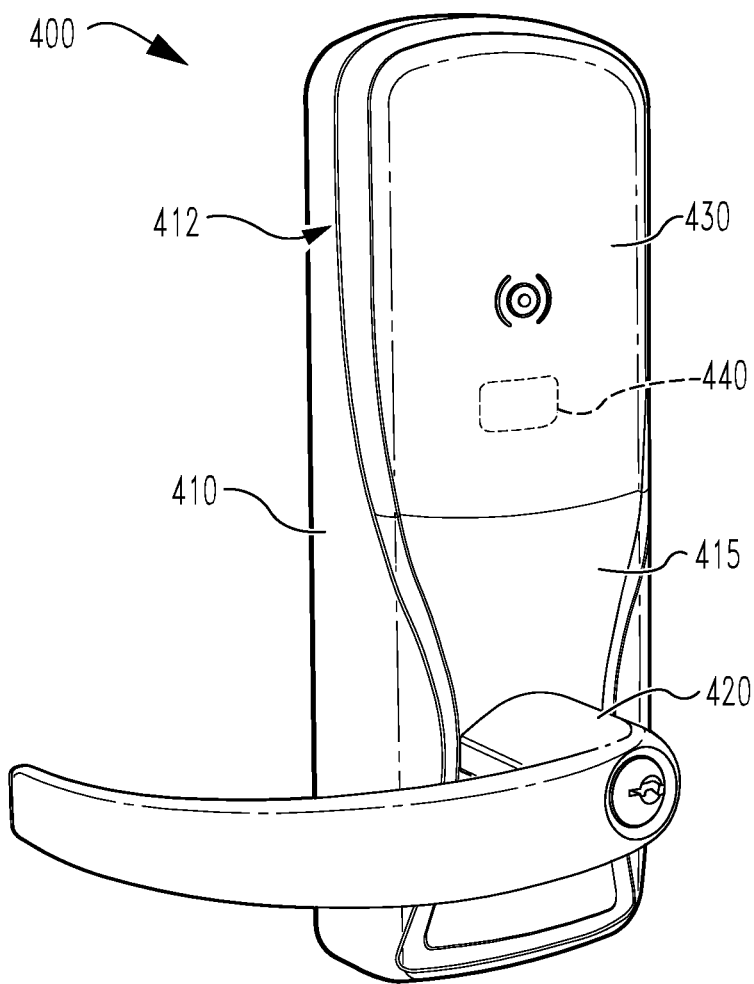
FIG. 7 is a perspective view of a trim according to certain embodiments.

With additional reference to FIG. 7, illustrated therein is a trim 400 according to certain embodiments. The trim 400 generally includes an escutcheon 410, a handle 420 rotatably mounted to the escutcheon 410, and a cover 430 according to certain embodiments. In certain forms, the trim 400 further includes a wireless communication device 440 mounted behind the cover 430 such that the cover 430 covers the wireless communication device 440.

The escutcheon 410 defines a cover mounting location 412 sized and shaped to receive the cover 430. The outer perimeter of the cover mounting location 412 generally conforms to the rear side of the cover 430. The escutcheon 410 is formed of metal, and may be provided with a surface finish 415.

The handle 420 is rotatably mounted to the escutcheon 410, and may be connected with a latch mechanism (e.g., the latch mechanism 134) such that rotation of the handle 420 actuates the latch mechanism. In the illustrated form, a lock cylinder 422 is mounted in the handle 420. It is also contemplated that the lock cylinder 422 may be mounted elsewhere or omitted entirely.

Figure 8:
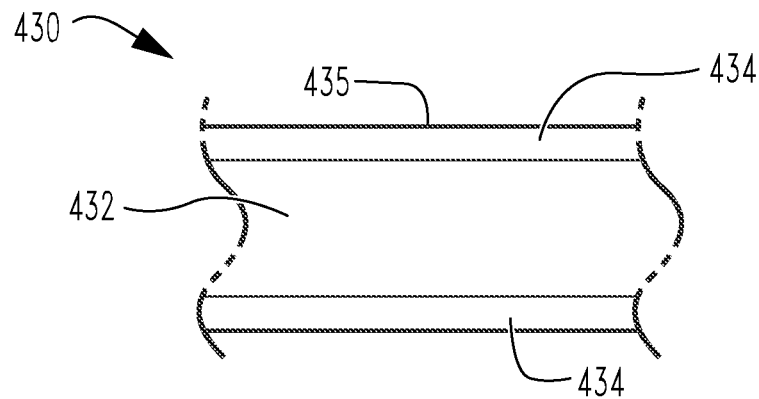
FIG. 8 is a schematic cross-sectional view of a portion of a cover of the trim illustrated in FIG. 7.

With additional reference to FIG. 8, the cover 430 is formed along similar lines as described above with reference to the cover 300, and generally includes a non-metallic substrate or monolithic structure 432, and further includes a metallic outer coating 434. The monolithic structure 432 may have a greater thickness (e.g., on the order of one millimeter to one centimeter or thicker), and the outer coating 434 may have a lesser thickness (e.g., on the order of a few angstroms to one micron or thicker). In certain embodiments, the thickness of the monolithic structure 432 may be on the order of at least one hundred times greater than the thickness of the coating 434, or at least one thousand times greater than the thickness of the coating 434.

As noted above, the escutcheon 410 may be provided with a particular surface finish 415. In embodiments in which the outer layer 434 is formed of a metal, the outer layer 434 may be provided with a matching surface finish 435 that generally matches the surface finish 415 of the escutcheon 410. In such forms, the cover 430 may increase the aesthetic appeal of the trim 400 by providing a consistent surface finish throughout the trim 400. Moreover, because the metallic coating 434 is relatively thin, the metallic coating 434 may not necessarily interfere appreciably with the wireless communications between the wireless communication device 440 and an external device. In addition or as an alternative, the coating 434 may protect the substrate of the monolithic structure 432, thereby reducing visible wear.

Figure 9:
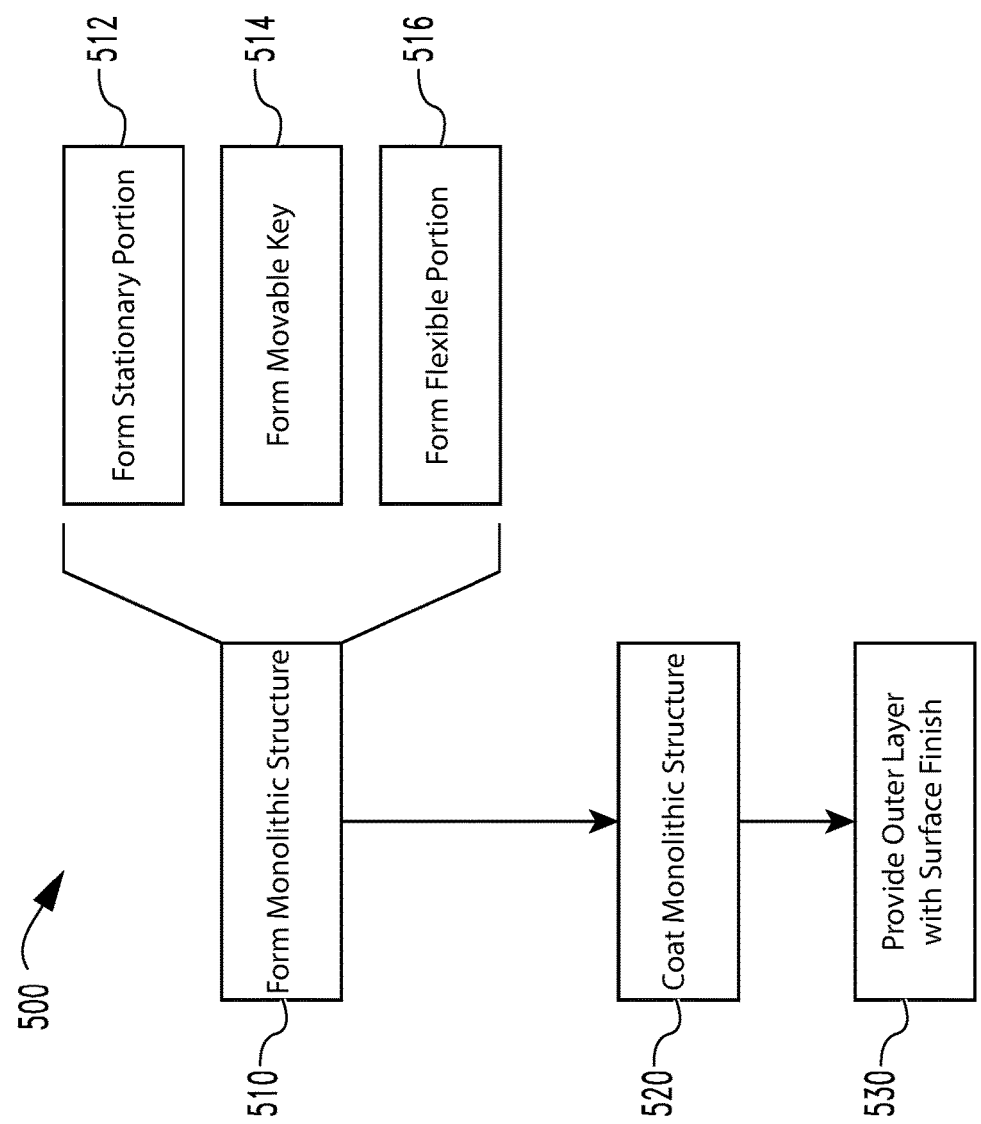
FIG. 9 is a schematic flow diagram of a process according to certain embodiments.

With additional reference to FIG. 9, illustrated therein is an exemplary process 500 that may be performed to manufacture a cover such as the cover 300. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 500 is described herein with specific reference to the cover 300 illustrated in FIGS. 2-6, it is to be appreciated that the process 500 may be performed to generate covers having additional and/or alternative features, such as the cover 430 illustrated in FIGS. 7 and 8.

The process 500 may begin with block 510, which generally involves forming a substrate or monolithic structure of a nonmetallic material. Block 510 may, for example, involve forming the monolithic substrate 302 of the cover 300. In certain forms, block 510 may involve forming the monolithic substrate with one or more movable keys. For example, block 510 may involve forming a stationary portion 312 in block 512, forming a movable key 314 in block 514, and forming a flexible portion 316 in block 516 such that the flexible portion 316 connects the stationary portion 312 with the movable key 314. Block 510 may, for example, involve molding the monolithic substrate of a material comprising a thermoplastic, such as a material comprising thermoplastic polyurethane. As will be appreciated, at least a portion of the substrate 302 may conform to a corresponding portion of the body to which the cover will be mounted (e.g., the escutcheon 210). In such forms, the stationary portion 312 may include at least a portion of the portion that conforms to the corresponding portion of the body.

The process 500 may continue to block 520, which generally involves coating the monolithic substrate with a metallic coating. Block 520 may, for example, involve coating the monolithic structure 302 with a metallic material (e.g., one comprising steel or copper) to thereby form the outer coating 304. In certain forms, block 520 may, by way of illustration, involve a cladding process, an electroplating process, or another process for depositing a relatively thin layer of metal on a substrate.

In certain forms, the process 500 may include block 530, which generally involves providing the metal outer layer with a surface finish. Block 530 may, for example, involve painting, brushing, distressing, and/or polishing the metallic outer layer. In certain embodiments, such as those in which the cover is intended to cover only a portion of the body to which it will be mounted, block 530 may involve providing the metal outer layer with a surface finish that matches the surface finish of the exposed portion of the body. By way of example, when the cover being manufactured is the cover 430, block 530 may involve providing the outer layer 434 with the surface finish 435 that matches the surface finish 415 of the escutcheon 410.

Figure 10:
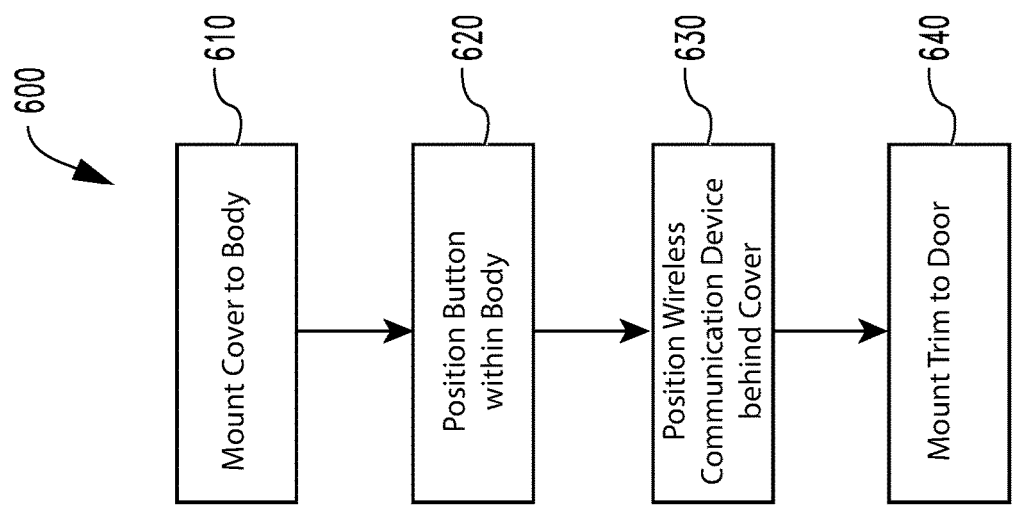
FIG. 10 is a schematic flow diagram of a process according to certain embodiments.

With additional reference to FIG. 10, illustrated therein is an exemplary process 600 according to certain embodiments. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 600 is described herein with specific reference to the cover 300 illustrated in FIGS. 2-6, it is to be appreciated that the process 600 may be performed to generate access control devices including covers having additional or alternative features, such as the cover 430 illustrated in FIGS. 7 and 8.

The process 600 generally involves assembling an access control device having a cover, such as a cover manufactured according to the above-described process 500. For example, the process 600 may involve creating an access control device along the lines of the above-described trim 200 or the above-described trim 400.

The process 600 may include block 610, which generally involves mounting the cover to a body such that at least a portion of the cover conforms to at least a portion of the body. As one example, block 610 may involve mounting the cover 300 to the escutcheon 210 such that the cover sidewalls 330 conform to the escutcheon sidewalls 214, the cover front side 310 is positioned in front of the escutcheon front side 212, and the lip 322 of the cover rear side 320 is positioned behind the escutcheon rear side 216. As another example, block 610 may involve mounting the cover 430 to the escutcheon 410 such that a perimeter of the cover 430 conforms to the perimeter of the cover mounting location 412.

In certain embodiments, the process 600 may include block 620, which generally involves positioning a button within the body such that a movable key of the cover is operable to actuate the button. For example, block 620 may involve positioning the PCBA 230 within the chamber 218 such that each movable key 314 is operable to actuate a corresponding one of the buttons 234.

In certain embodiments, the process 600 may include block 630, which generally involves positioning a wireless communication device behind the cover. As one example, block 630 may involve positioning the wireless communication device 440 behind the cover 430. As should be appreciated, block 630 may be performed prior to installing the cover 430 such that the cover 430, when installed to the escutcheon 410, covers the wireless communication device 440. In embodiments in which the outer coating 434 is relatively thin, the cover 430 does not appreciably interfere with the wireless communications between the wireless communication device 440 and an external device positioned outside the trim 400.

The process 600 may include block 640, which generally involves mounting an assembled trim including the cover to a door. In certain embodiments, block 640 may involve forming a seal between the cover and the door. For example, installation of the trim 200 to the door 90 may form a seal between the rear side 320 of the relatively pliable cover 300 and the outer surface of the door 90 such that the internal components (e.g., the PCBA 320) are protected from the elements.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A cover for a door hardware apparatus, the cover comprising:
    a front side comprising a stationary portion;
    a rear side opposite the front side;
    one or more walls extending between the front side and the rear side, the one or more walls at least partially defining a chamber behind the stationary portion; and
    a key movably connected to the stationary portion of the front side for movement between a projected position and a depressed position;
    wherein the cover comprises a monolithic structure including at least a portion of the front side and at least a portion of the key; and
    wherein the monolithic structure comprises a non-metallic material.

2. The cover of claim 1, wherein the monolithic structure further comprises a flexible region; and
    wherein the key is connected with the stationary portion via the flexible region.

3. The cover of claim 2, wherein the flexible region circumferentially surrounds the key.

4. The cover of claim 1, further comprising an outer layer coating at least a portion of the monolithic structure; and
    wherein the outer layer comprises a metallic material.

5. The cover of claim 1, further comprising an opaque outer layer comprising an indicium positioned on the key; and
    wherein the monolithic structure is non-opaque.

6. The cover of claim 1, wherein the monolithic structure further comprises at least one additional key movably connected to the front side.

7. The cover of claim 1, wherein the one or more walls project rearward from an outer periphery of the stationary portion.

8. A door hardware apparatus, comprising:
    a body configured for mounting to a door, wherein the body is formed at least in part of a first metallic material; and
    a cover at least partially covering the body, the cover comprising:
        a substrate conforming to at least a portion of the body, wherein the substrate is formed of a non-metallic material; and
        an outer layer covering at least a portion of the substrate, wherein the outer layer comprises a second metallic material.

9. The door hardware apparatus of claim 8, wherein the body comprises a body front side and a body rear side; and
    wherein the cover comprises a cover front side positioned in front of the body front side, and a cover rear side positioned behind the body rear side.

10. The door hardware apparatus of claim 9, wherein the cover rear side comprises an opening and a lip circumferentially surrounding the opening, the lip projecting inward from an outer periphery of the cover rear side.

11. The door hardware apparatus of claim 9, wherein the cover rear side is planar.

12. The door hardware apparatus of claim 8, wherein a visible portion of the body is not covered by the cover;
    wherein the visible portion comprises a first surface finish; and
    wherein at least a portion of the outer layer comprises a second surface finish corresponding to the first surface finish.

13. The door hardware apparatus of claim 12, wherein the second surface finish matches the first surface finish.

14. The door hardware apparatus of claim 8, wherein the first metallic material and the second metallic material are the same as one another.

15. The door hardware apparatus of claim 8, wherein the non-metallic material comprises a thermoplastic material.

16. The door hardware apparatus of claim 15, wherein the thermoplastic material comprises thermoplastic polyurethane.

17. The door hardware apparatus of claim 8, further comprising a light source positioned within the body;
    wherein the non-metallic material is non-opaque;
    wherein the metallic material is opaque; and
    wherein the outer layer comprises one or more indicia.

18. The door hardware apparatus of claim 8, further comprising a button mounted within the body;
    wherein the cover comprises a key operable to actuate the button, wherein the key is movable relative to a fixed portion of the cover; and
    wherein a monolithic structure defines at least a portion of the key and at least a portion of the fixed portion of the cover.

19. The door hardware apparatus of claim 8, wherein a thickness of the substrate is at least one hundred times a thickness of the outer layer.

20. The door hardware apparatus of claim 8, wherein the outer layer is a coating on the substrate.

21. A method, comprising:
    forming a cover for a door hardware apparatus comprising a body, wherein forming the cover comprises:
        forming a substrate of a non-metallic material such that at least a portion of the substrate conforms to at least a portion of the body; and
        forming an outer layer on at least a portion of the substrate, the outer layer comprising a metallic material.

22. The method of claim 21, further comprising providing the outer layer with a surface finish.

23. The method of claim 21, further comprising mounting the cover to the body such that the at least a portion of the substrate conforms to the at least a portion of the body.

24. The method of claim 23, further comprising positioning a button behind a movable key of the cover such that the movable key is operable to actuate the button.

25. The method of claim 21, wherein forming the substrate comprises:
   forming a stationary portion comprising the at least a portion of the substrate that conforms to the at least a portion of the body; and
   forming a movable key connected with the stationary portion via a flexible portion; and
   wherein the stationary portion, the movable key, and the flexible portion are integrally formed as a monolithic structure.

26. The method of claim 21, wherein the non-metallic material is non-opaque; and
   wherein forming the outer layer comprises forming one or more indicia.

27. The method of claim 26, further comprising positioning a light source behind the substrate such that light is transmitted through the non-opaque material.

28. The method of claim 21, wherein forming the outer layer on at least a portion of the substrate comprises coating the at least a portion of the substrate with the metallic material.

* * * * *